UNITED STATES PATENT OFFICE.

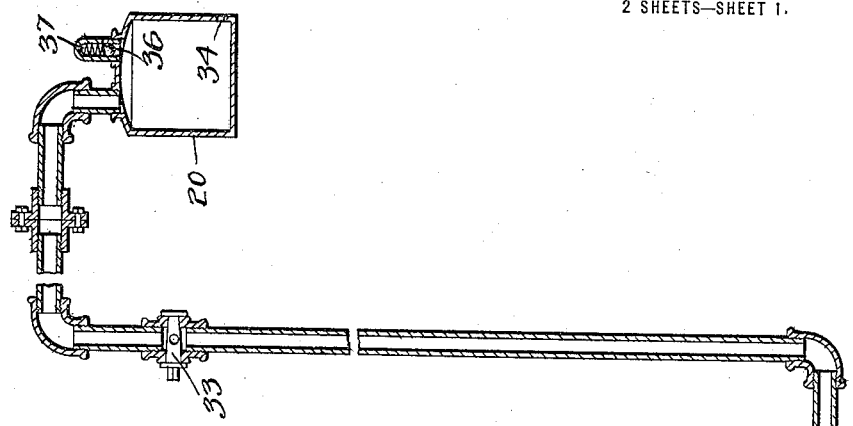
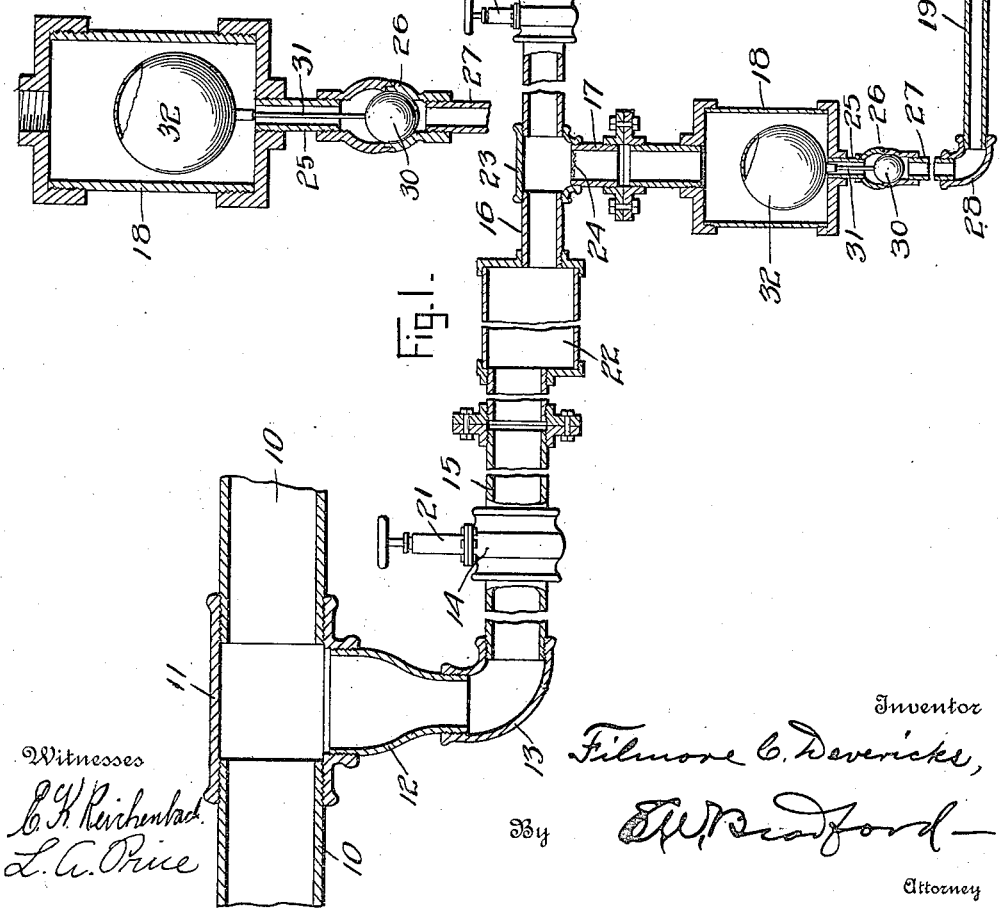

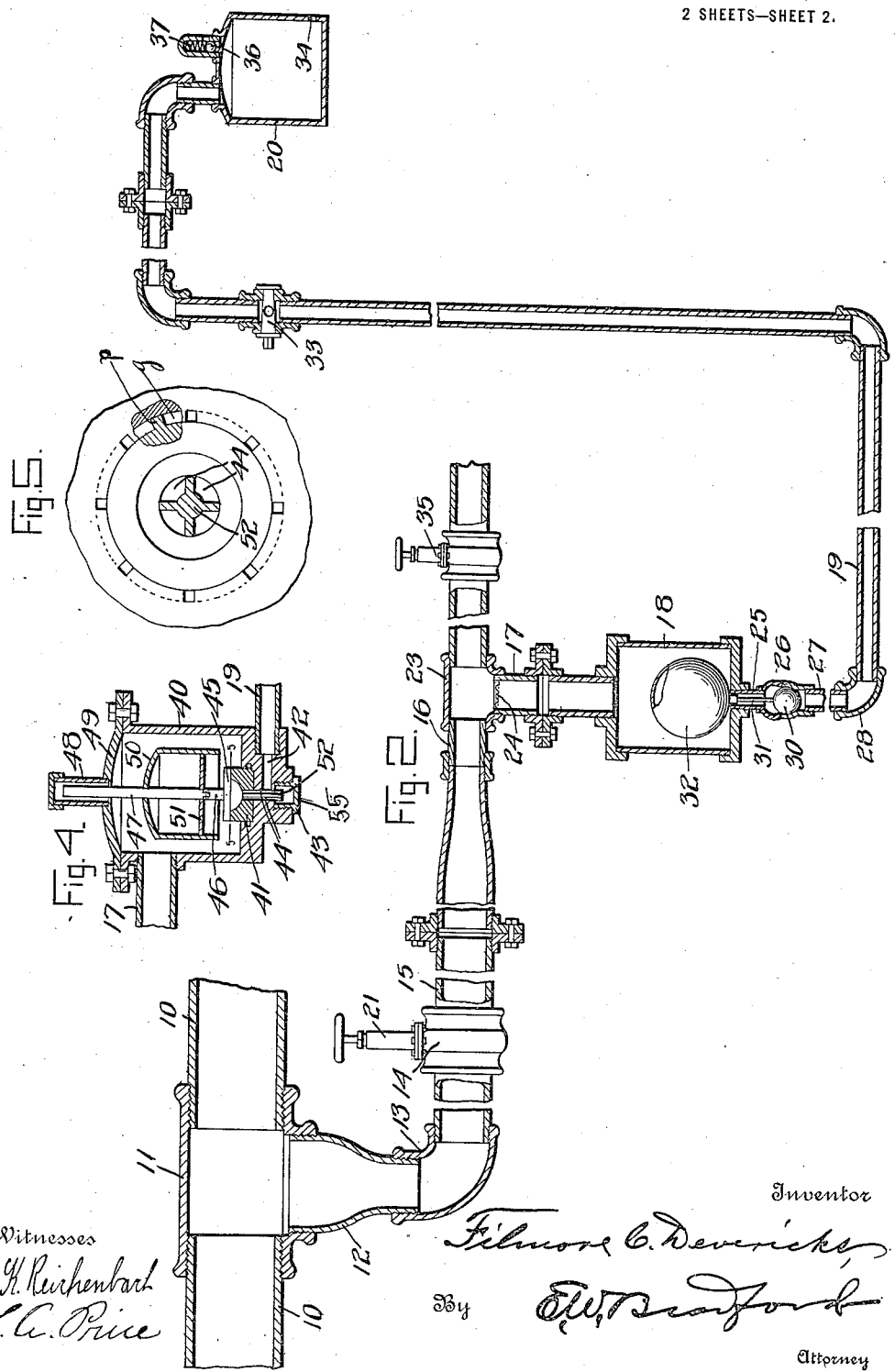

FILMORE C. DEVERICKS, OF CLARKSBURG, WEST VIRGINIA.

DRAIN FOR PIPE-LINES.

1,172,116.  Specification of Letters Patent.  Patented Feb. 15, 1916.

Application filed January 8, 1910. Serial No. 536,987.

*To all whom it may concern:*

Be it known that I, FILMORE C. DEVERICKS, a citizen of the United States, residing at Clarksburg, in the county of Harrison and State of West Virginia, have invented certain new and useful Improvements in Drains for Pipe-Lines, of which the following is a specification.

The object of my said invention is to provide an automatically acting drain for gas, steam, air and other pipe lines for the purpose of removing therefrom the products of condensation and collecting such liquid substances as may be contained in or carried by the gaseous substances, whereby said pipe lines are relieved of resistance to the flow of the gas through them, the waste of the gas, air, or steam, usually employed in blowing out such accumulations is obviated and such liquid substances as are of value are saved for use, all as will be hereinafter more fully described and claimed.

Referring to the accompanying drawings which are made a part hereof and on which similar reference characters indicate similar parts, Figure 1 is a sectional view of a portion of a pipe line showing my automatic drain apparatus attached, Fig. 2 a similar view showing a modified form, Fig. 3 a detail view of the automatic drain valve on an enlarged scale, Fig. 4 a similar view of a valve of modified construction, and Fig. 5 a detail cross section on the dotted line 5—5 in Fig. 4 on an enlarged scale.

In said drawings the portions marked 10 indicate the main line pipe, 15 the liquid line pipe, 16 a second section of the liquid line pipe, 17 a pipe leading therefrom to the drain pipe, 18 the casing of the automatic draining valve, 19 the discharge, or drain, pipe leading from said casing, and 20 a storage tank for the drained liquid.

The main pipe line 10 may be the pipe line leading from a gas well and designed to carry the fuel gas therefrom to the pipe system from which it is to be used, and it is in connection with such a pipe line that my invention is peculiarly valuable and advantageous, as will be hereinafter more fully set forth. It may also be used on any air or steam pipe line, in either of which products of condensation, or liquid carried by the air or steam, will accumulate or interfere with the operation of the line, requiring occasional "blow-outs" to free the line from such accumulations and the resistance caused thereby, which "blow-outs" require a considerable waste of air, steam, or gas required for this purpose. The two sections of line 10 are shown as joined by a T 11 to which is connected a branch 12 which in turn is connected by an elbow 13 with the end of the liquid line pipe 15. A valve casing 14 is shown interposed in pipe 15 in which a cut-off or gate-valve 12 of any appropriate construction is provided for the purpose of cutting off the flow, or opening or closing the pipe 15, for any purpose. The various sections of the pipes and casings are connected by fittings and couplings of the usual or any approved construction and in the well known manner and require no special description, being clearly understood by those familiar with the art.

A reservoir is interposed between the pipes 15 and 16, composing the liquid line, pipe 15 being connected near the upper side of said reservoir and pipe 16 leading from the opposite end and near the lower side thereof. Said reservoir serves as a storage receptacle for holding any liquid necessary while the draining apparatus is out of operation for any reason. Beyond said reservoir a T 23 is interposed in pipe 16 and a pipe 17 leads therefrom, either downwardly, as shown, or otherwise, as may be desired or appropriate for the particular apparatus being constructed, and is connected with casing 18, as shown, or in any appropriate manner. A strainer 24 composed of any suitable reticulated material is preferably mounted over the upper end of pipe 17 and serves to strain the liquid and remove any sediment or foreign matter therefrom.

The casing 18 is of any suitable form or construction, that shown consisting of a cylindrical body (such as a short section of pipe of suitable size) with a top and bottom of appropriate form secured thereto by screw-threaded connections. The top is formed with a suitable aperture into which the lower end of pipe 17 is threaded and the bottom is formed with an aperture into which a short pipe 25 is threaded. The lower end of pipe 25 is threaded into the upper end of a valve casing 26, which is formed with a valve seat near its lower end, its extreme lower end being screw-threaded onto a pipe 27, which is connected by an elbow 28 with the discharge or drain pipe 19. Within valve casing 26 is mounted a spherical-shaped valve 30 connected by a rod 31 with a float 32 mounted in casing 18. The pipe 19 leads to storage tank 20 and has a valve 33 interposed therein at any suitable or desirable point for the control of the flow of the liquid from casing 18 to storage tank 20. An aperture 34 is formed in the lower side of tank 20 in which may be mounted a faucet, or from which may lead a pipe, (not shown) through which the fluid collected in said tank may be drawn off or may be conducted to the place where it is desired to use it, for any purpose. Beyond the T 23 in pipe 16 a valve 35 is provided which may be used for the purpose of controlling the flow of any gas or air, or steam that may accumulate in pipes 15 and 16 from any cause. It will be readily seen that the valve 30 and co-operating parts may be mounted within casing 18 if preferred. A pop-valve 36 is arranged in a casing 37 on top of tank 20 for the purpose of relieving any pressure that may collect therein from the escaping gas, air or steam coming through pipe 19 into said tank and its object being to maintain atmospheric pressure within said tank at all times.

Fig. 2 shows the same apparatus as illustrated in Fig. 1 except that the reservoir 22 interposed between sections 15 and 16 of the liquid line is omitted. This reservoir is for the purpose of allowing the liquid to accumulate and to take care of such accumulation for a time while the automatic draining apparatus, represented by pipe 17, casing 18, pipe 19 and tank 20 may be for any reason out of operation, as when tank 20 is full. Said reservoir, as will be readily understood, may not in all instances be necessary and where not required may be omitted and the apparatus used as shown in Fig. 2.

In Figs. 4 and 5 I have shown a modified arrangement of the automatic float-operated draining valve. In this construction the casing 40 may be of any appropriate form or construction and I have shown the drain pipe 17 leading into said casing from the side instead of from the top as in the principal views. In the bottom of said casing is formed a recess in which is mounted a valve-seat 41, held therein by any approved means, as an inter-engaging radial projection $p$ on the seat and a groove $g$ in the casing, as shown in Fig. 5. Below said valve-seat are formed discharge apertures 42 and 43 each communicating with a central aperture 44 leading through the valve-seat 41 to communicate with the interior of casing 40. I have shown the discharge pipe 19 as leading from the horizontal aperture 42 and the other aperture 43 is closed by an ordinary screw-plug 55. It will be understood that the bottom of the casing 40 may be formed with a series of discharge apertures leading from different points and that the discharge pipe 19 may be connected with the one located most advantageously in the arrangement desired, while the others will be closed as indicated. The valve-seat 41 is formed with a semi-spherical depression in its top surface from the bottom of which leads the discharge aperture or perforation 44 with which the several apertures 42, 43, etc., communicate.

A valve 45, comprising a plate adapted to fit upon the top face of valve-seat 41 and formed with a central semi-spherical surface on its underside to fit within the semi-spherical depression in the valve-seat, is mounted within casing 40 and has a central stem 46 extending up from the top surface thereof. Said stem is formed bifurcated at its upper end and is connected by a horizontal pivot with a rod 47 which projects up into a central socket or tube 48 formed with or attached to the central portion of the top plate 49 of casing 40. Said socket serves as a guide for said rod 47 upon which is mounted the float 50 comprising a hollow metal body the bottom 51 of which is preferably located a distance above the lower edges of its walls in order to provide an air space within said walls. A guide pin 52 depends from the lower side of valve 45 extending into the aperture 44 and is formed with radial wings adapted to bear against the walls of said aperture and serve to guide said valve, as best shown in Fig. 5. Other forms of float-valves found appropriate may, of course, be substituted for that shown, and various modifications in the details of general construction and arrangement of parts of the apparatus may be made without departing from my invention.

In operation the oil contained in the gas, or the other liquid contained, or formed, in the gaseous substances passing through main 10, will pass through the drain pipe 12 into the liquid line 15 and 16 and be drained from said line through the pipe 17 and strainer 24, covering the top thereof, into valve casing 18, where, after a sufficient amount accumulates to raise the valve through the medium of float 32, it will be discharged through the pipe 19 into the storage tank 20, being forced through said pipe either under gravity or under the pressure of the gases in the pipes, as will be readily understood. When the liquid in casing 19 falls to the point where valve 30 again seats, the flow into pipe 19 will be cut off and the accumulation of the liquid in casing 18 will again begin, the process continuing indefinitely and automatically as long as the mains are in use. The liquid is drawn or conducted from tank 20 as before stated. When for any purpose it is desired to cut off the automatic draining apparatus it can be done by the use of the gate-valve 21 and when it is desired to cut off the flow of any gas from line 16 it can be done by the use of the gate-valve 35.

These valves can also be used for the purpose of controlling the area of the opening through these pipes to regulate the drainage and gas pressure as may be desired.

Having thus fully described my said invention, what I claim as new, and desire to secure by Letters Patent, is:

1. An apparatus for automatically collecting and elevating liquid condensation in mains, comprising a reservoir connected with said main by means of suitable piping, means for regulating the flow of liquid to said reservoir, a storage tank for said liquid located above said main and connected with said reservoir by suitable piping, means within said reservoir controlled by the liquid collected therein for dispensing accumulated quantities of liquid at intervals to said storage tank, and means connected in said storage tank for maintaining atmospheric pressure therein, substantially as set forth.

2. An apparatus for automatically collecting and elevating liquid fuel carried by or condensed from gas as it is conducted through mains from natural gas wells, comprising a branch leading from the bottom of said main to drain off the liquid, a reservoir connected with said branch for accumulating the liquid, a valve in said branch for regulating the flow of liquid to said reservoir, a storage tank for said liquid located above said main, piping leading from said reservoir to said storage tank, a float controlled valve located within said reservoir for dispensing accumulated quantities of liquid therefrom, and an automatic valve connected in said storage tank for maintaining atmospheric pressure therein, substantially as set forth.

In witness whereof, I have hereunto set my hand and seal at Clarksburg, West Virginia, this 21st day of December, A. D. nineteen hundred and nine.

FILMORE C. DEVERICKS. [L. S.]

Witnesses:
E. B. HARDESTY,
GEO. M. KYLE.

Copies of this patent may be obtained for five cents each, by addressing the "Commissioner of Patents, Washington, D. C."